United States Patent [19]
Gaiser

[11] Patent Number: 4,639,104
[45] Date of Patent: Jan. 27, 1987

[54] SIDEPIECE END OF A SPECTACLE FRAME SIDEPIECE

[76] Inventor: Hans Gaiser, Thuringer Str. 19, 7410 Reutlingen 24, Fed. Rep. of Germany

[21] Appl. No.: 736,688

[22] Filed: May 22, 1985

[30] Foreign Application Priority Data
May 25, 1984 [DE] Fed. Rep. of Germany ....... 3419509

[51] Int. Cl.⁴ ............................ G02C 5/18; G02C 5/14
[52] U.S. Cl. ........................................ 351/117; 351/122
[58] Field of Search ................................ 351/117, 122

[56] References Cited
U.S. PATENT DOCUMENTS
4,563,066 1/1986 Bononi ............................... 351/122

Primary Examiner—Rodney B. Bovernick

[57] ABSTRACT

The end of a spectacle frame sidepiece has a metallic tang with a flat profile in the hard bending direction. A thin hard synthetic plastic sleeve surrounds the flat profile. The sleeve has a small, integrally-extending, apertured plate. A sheath of injection-moulded silicone rubber (Shore-D hardness 10–30 according to DIN 53505), surrounds the sleeve, the plate and the tang and extends as far as the end face of the sheath. Through-passing holes are provided at intervals on opposite, wider, side walls of the sleeve, and the sheath material engages in these holes.

8 Claims, 6 Drawing Figures

SIDEPIECE END OF A SPECTACLE FRAME SIDEPIECE

The invention relates to a sidepiece end of a spectacle sidepiece, and more particularly, a sidepiece end having a homogeneous metallic tang with a flat profile in the hard bending direction, a thin sleeve of hard synthetic plastics material having a blind hole for receiving the flat profile, a small plate extending integrally from the synthetic plastics sleeve having a flat profile and at least one transverse aperture, and a sheath, of injected synthetic plastics silicone rubber material of a Shore-D hardness of 10-30 according to DIN 53505, surrounding the synthetic plastics sleeve, the small plate and the tang and having an end face at one end remote from the small plate.

BACKGROUND OF THE INVENTION

Such sidepiece ends are known from West German published specification No. 3,237,501 which was published on the Apr. 12th 1984. The problem exists in securing the very soft material of the sheath to the tang, namely not only for the duration of a novelty fair or the duration of trying on at the optician's premises or other short periods under favorable conditions. Rather, the connection must hold even when a thin film of perspiration penetrates into the sidepiece end, which regarded absolutely cannot be prevented if the sidepiece end is worn in an atomosphere with very low or very high temperatures, if the sidepiece end is bent frequently during the life of the spectacle frame, or even if the sidepiece end is brought by oversight to very high temperatures for the purpose of bending, although this was necessary only in the old technique and is no longer necessary with the soft sheaths.

In the case of the sidepiece end according to West German Published Specification No. 3,237,501 the danger exists that in the course of time the longer part of the sheath may twist more or less around the tang. These sheaths have oval cross-section, and then that surface which per se ought to be directed upwards or downwards rests on the head of the wearer. Furthermore even a very low quality demand of spectacle frames requires that the longer part of the sheath should remain connected with the tang and not move in the manner of a stocking for example.

OBJECT AND STATEMENT OF THE INVENTION

It is the object of the invention to provide a sidepiece end which avoids the above designated disadvantages and produces a practical connection between the very soft synthetic plastics material and the metallic tang. It is an objective, as before, to profit from the softness of the material and it should also be possible for the spectacle frame sidepiece end to be bent just as easily as before. The sidepiece end must lose nothing of its aesthetics. The construction must be subordinated to aesthetics. It is the objective to avoid the necessity of giving up the usual tang philosophy and having recourse to special constructions. The sidepiece end should be capable of mass production and it is to be possible as before to start from rectilinearly extended tangs in assembly.

In accordance with the invention these objects are achieved and the above-mentioned disadvantages are avoided by the following features of the invention: (a) the synthetic plastics sleeve extends integrally as far as the end face of the sheath and has end walls and side walls that are mutually opposite each other and wider than the end walls, (b) a plurality of through-passing holes are provided spaced from one another in the mutually opposite side walls of the synthetic plastic sleeve, and (c) the material of the injection-moulded sheath engages in the holes.

Advantageously, the invention includes the following additional features: the holes are in alignment. Due to the feature, the through-passing holes can not only be used for the securing of the soft silicone material but also in the operation of injection-moulding the synthetic plastics sleeve. The through-passing holes are the negative forms of push member pins in the injection mould. This configuration contributes to the possibility of making the synthetic plastics sleeve on the one hand very thin while being absolutely certain that the wall thickness of this synthetic plastics sleeve is also maintained and does not become very slight or even drop to zero. In this case then the silicone rubber would meet directly with the tang.

There are two to five through-passing holes, preferably four. By the feature the objective is achieved that firstly sufficient possibilities of anchorage for the silicone rubber, nextly sufficient points of action for the positioning pins of the injection-moulding tool and thirdly not too many weakening through-passing holes are provided. In fact these holes lie in the neutral flexure zone of the sidepiece end, but nevertheless too many holes would weaken the synthetic plastics sleeve too much. The holes moreover also contribute to sufficiently easy flexibility of the sidepiece end.

At least one of the through-passing holes nearer to the small plate is larger than the others and occupies at least three quarters of the height of the blind hole. By the features, one obtains an especially favorable shape-secure anchorage in that region where according to experience the sidepiece end is mostly bent. Furthermore this larger blind hole can be used for a fixing according to FIG. 4, which guarantees that the synthetic plastics sleeve has the form intended by the designer even after injection-moulding, thus the sheath remains in the customary position.

When the synthetic plastics sleeve is produced it has a specific length. However its length shrinks, whether in ageing, whether due to heat or other influences. It cannot be said in advance which region of the synthetic plastics sleeve remains firmly connected with the tang. However by securing the synthetic plastics sleeve on only a quite specific region of the tang, shrinkage actions are prevented from acting substantially upon the securing region and withdrawing from the latter a part of its retaining power by way of an incorrectly directed initial stress.

The synthetic plastics sleeve has, in its end region remote from the small plate, a press fit configuration surrounding the tang and is not non-displaceably seated elsewhere on the tang. In the region of the press fit configuration, the tang comprises a widening slide-up flank followed by a wider region, and the synthetic plastics sleeve has a wider blind hole in the area of the wider flank region that is under-dimensioned relative to the wider flank region, causing the press fit. A synthetic plastics primer is applied to the synthetic plastics sleeve. By the features, it is possible for the press fit to be realized without additional constructional parts and one remains with a three-part component comprising only tang, synthetic plastics sleeve and sheath.

DESCRIPTION OF DRAWINGS

The invention will now be described with reference to a preferred example of embodiment. In the drawing.

DETAILED DESCRIPTION

Figure 1:
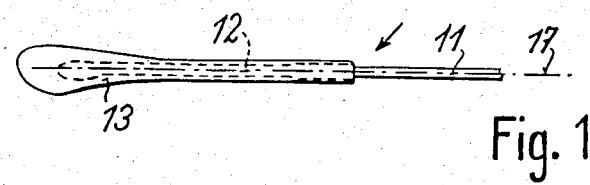
FIG. 1 shows a borken-away sidepiece end.

A tang 11 consists of metal and has a flat profile, also called I-profile. The tang has an approximately rectangular cross-section. On the tang 11 there is seated a synthetic plastics sleeve 12 of RILSAN P 20. This again is surrounded by a sheath 13 of a silicone rubber have a Shore-D hardness of 10-30 according to DIN 53505.

The synthetic plastics sleeve 12 has on the left a small plate 14 having two apertures 16. The synthetic plastics sleeve 12 extends along a geometrical longitudinal axis 17. In total such a synthetic plastics sleeve 12 is 60 mm. in length. It has a linear blind hole 18 extending along the longitudinal axis 17. Its first region 19 is substantially longer according to FIG. 2 than its second region 21. Seen in width according to FIG. 3, the side walls of the blind hole 18 are in alignment. In the lateral view according to FIG. 2 however it is seen that on the right the first region 19 passes by way of two symmetrical slide-up flanks 22, 23 into the second region 21, which is wider in this view.

Figure 2:
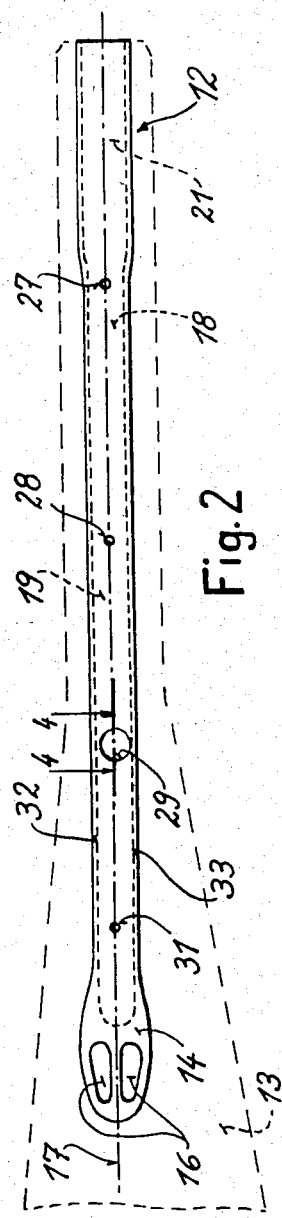
FIG. 2 shows the side view of the synthetic plastics sleeve, enlarged 3.5 times over FIG. 1.
Figure 3:
FIG. 3 shows the plan view of FIG. 2.

Since the wall thickness of the synthetic plastics sleeve 12 is around 0.4 mm. everywhere, the outline of the synthetic plastics sleeve 12 widens in the second region 21 according to FIG. 2.

A group of 4×2 holes 27, 28, 31 is provided at approximately equal intervals in the side walls 24, 26, the holes being aligned in pairs in the view in FIG. 2. They are situated with their centre point on the geometrical longitudinal axis 17. The holes 27, 28, 31 are substantially smaller in diameter than the hole 29, which reaches with its periphery nearly to the upper wall 32 and the lower wall 33. The small plate 14 is somewhat widened and thus internally slightly imitates the droplet form of the sheath 13.

The tang 11 lies with its region 34 in the first region 19. While in fact it has no substantial mechanical play there, it can shift however somewhat in relation to the side wall 24, 26, the upper wall 32 and the lower wall 33, as is necessary in the bending down of the side piece end and as can be necessitated by heat shrinkages of the synthetic plastics sleeve 12.

The region 36 adjoins the region 34 by way of the slide-up flanks 22, 23.

Figure 6:
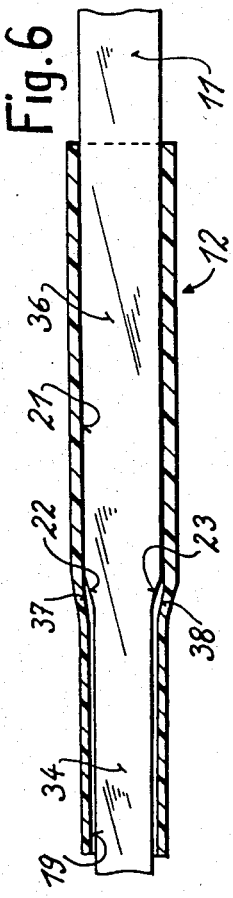
FIG. 6 shows the right-hand side of FIG. 2, but enlarged seven times compared with FIG. 1.

In the second region 21 the synthetic plastics sleeve 12 according to FIGS. 2 and 6 is less high than would be necessitated by the dimensioning of the region 36, measured there in height. Therefore the second region 21 of the synthetic plastics sleeve 12, which has a Shore-D hardness of 64, is seated with shrunk fit on the region 36. The slide-up flanks 22, 23 are not in contact with the funnel surfaces 37, 38 of the synthetic plastics sleeve 12, or merely touch them.

Figure 5:
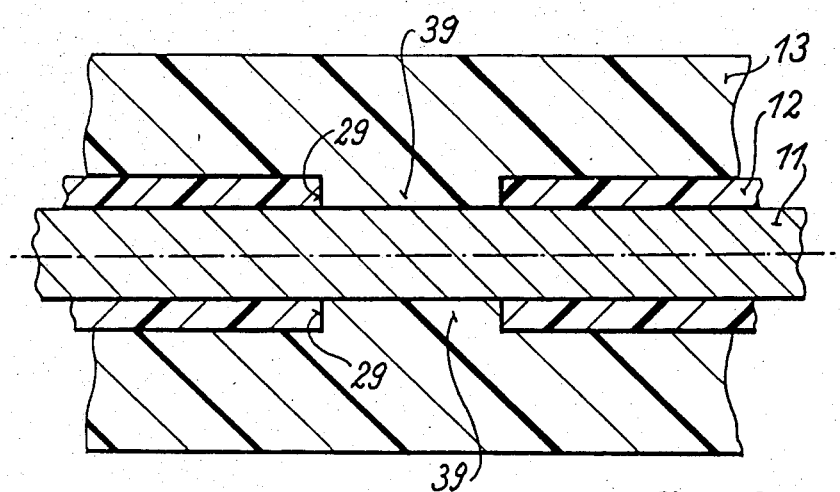
FIG. 5 shows an illustration similar to FIG. 4, but through the finished sidepiece end, likewise on the scale 10:1.

The sheath 13 is injection-moulded on to the synthetic plastics sleeve 12 and protrudes somewhat beyond its edge on the right. This injection-moulding operation is carried out after the synthetic plastics sleeve 12 has been completed. In this case in the blind hole 18 there is situated a tongue which holds the synthetic plastics sleeve 12, does not expand the second region 21 but forms a bottom for the holes 27, 28, 29 and 31. If now the material of the sheath 13 is injection-moulded, it also passes through the apertures 16 and holds itself fast there by shape-engagement. However it also penetrates into the holes 27, 28, 29 and 31 and the knobs thus produced give further retention over the length. Furthermore a primer, which cannot be represented by reason of its slight layer thickness, gives further retention on the synthetic plastics sleeve 12 to the sheath 13. Two such knobs 39 are represented in FIG. 5, as they lie in the hole 29. The same is valid in relation to the holes 27, 28 and 31.

Figure 4:
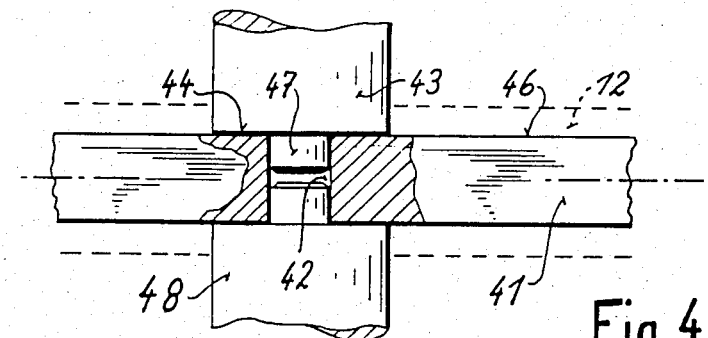
FIG. 4 shows a section along the line 4—4 in FIG. 2, enlarged ten times, but for the condition of the injection-moulding of the synthetic plastics sleeve.

In FIG. 4 there is seen a push member 41 pertaining to an injection mould (not shown). When it is withdrawn after the injection-moulding, one has the blind hole 18. The push member 41 has a through-passing bore 42 coaxially with the hole 29. According to FIG. 4 a retaining finger 43 comes from above, having a circular-cylindrical cross-section and abutting with its annular surface 44, parallel to the longitudinal axis 17, on the upper side 46 of the push member 41. Within the annular surface 44 there is provided a circular-cylindrical projection 47 which lies in the through-passing bore 42, extending in to less than a half.

A second retaining finger 48 of like configuration comes from below according to FIG. 4. When the retaining fingers 43, 48 are driven towards one another, they not only prevent the possibility of the push member 41 deviating upwards or downwards according to FIG. 4, but rather with a relatively large area they prevent the push member 41 from being able to move there at all.

The holes 27, 28, 31 of smaller diameter are produced because only retaining fingers of the size of the projection 47 are provided there in the injection-moulding tool. This is also sufficient there. The upward and downward movement of the push member 41 is reliably prevented.

I claim:

1. In a sidepiece end of a spectacle frame from sidepiece, having
    a homogeneous metallic tang with a flat profile in the hard bending direction,
    a thin sleeve of hard synthetic plastics material having a blind hole for receiving said flat profile,
    a small plate extending integrally from said synthetic plastics sleeve having a flat profile and at least one transverse aperture, and
    a sheath, of injected synthetic plastics silicone rubber material of a Shore-D hardness of 10-30 according to DIN 53505, surrounding said synthetic plastics sleeve, said small plate and said tang and having an end face at one end remote from said small plate, the improvement wherein:
    (a) said synthetic plastics sleeve extends integrally as far as said end face of said sheath and has end walls and side walls that are mutually opposite each other and wider than said end walls, (b) a plurality of through-passing holes are provided spaced from one another in said mutually opposite side walls of said synthetic plastics sleeve, and (c) said material of the injection-moulded sheath engages in said holes.

2. In a sidepiece end according to claim 1, wherein said holes are in alignment.

3. In a sidepiece end according to claim 1, comprising two to five through-passing holes.

4. In a sidepiece end according to claim 1, comprising four through-passing holes.

5. In a sidepiece end according to claim 1, wherein at least one of said through-passing holes nearer to said small plate is larger than the others and occupies at least three quarters of the height of said blind hole.

6. In a sidepiece end according to claim 1, comprising a synthetic plastics primer applied to said synthetic plastics sleeve.

7. In a sidepiece end according to claim 1, wherein said synthetic plastics sleeve has, in its end region remote from said small plate, a press fit configuration surrounding said tang and is not non-displaceably seated elsewhere on said tang.

8. In a sidepiece end according to claim 7, wherein, in the region of said press fit configuration, said tang comprises a widening slide-up flank followed by a wider region, and said synthetic plastics sleeve has a wider blind hole in the area of said wider flank region that is under-dimensioned relative to said wider flank region, causing said press fit.

* * * * *